UNITED STATES PATENT OFFICE.

ALEXANDER S. RAMAGE, OF NEWARK, NEW JERSEY, ASSIGNOR TO CHEMICAL DEVELOPMENT CO., OF BUFFALO, NEW YORK, A CORPORATION OF COLORADO.

PROCESS OF PRODUCING ELECTROLYTIC COPPER.

949,003.

No Drawing.

Specification of Letters Patent. Patented Feb. 15, 1910.

Application filed July 2, 1909. Serial No. 505,617.

*To all whom it may concern:*

Be it known that I, ALEXANDER S. RAMAGE, a citizen of the United States, residing at Newark, in the county of Essex and State of New Jersey, have invented certain new and useful Improvements in Processes of Producing Electrolytic Copper, of which the following is a specification.

The object of this invention is the production of electrolytic copper from copper ores, more particularly from low-grade sulfids. The pure copper sulfid may be readily obtained from such low-grade sulfids by fractional roasting and chemical flotation in the manner described in my application, Ser. No. 505,614 filed July 2, 1909, or otherwise. This nearly pure sulfid of copper I place in a cylindrical furnace where it is reduced to the metallic state by mixture of hydrogen and water gas at a low red heat. At this temperature the hydrogen reduces the copper sulfid to metallic copper in the form of a powder while the carbonic oxid and sulfureted hydrogen gases pass off and are led under and around the cylindrical furnace and burned to supply the heat necessary for reduction.

The hydrogen of the water gas, together with that separately introduced forms a considerably greater proportion of the mixed gases than the carbon monoxid, so that the reducing action of the hydrogen is not substantially diminished by a large volume of inert gases. The use of hydrogen in excess of the proportion existing in ordinary water-gas presents the further advantage that it gives a proper balance between the reducing and heating effects of the gas. Carbon monoxid is inert with respect to sulfid ores and hydrogen alone is active in the reduction; the carbon monoxid being merely heated and subsequently burned beneath the furnace, in conjunction with the hydrogen sulfid, to provide the temperature necessary for the reduction by hydrogen. If water-gas alone were used the result would be uneconomical by reason of the unnecessary preponderance of the fuel gases, carbon monoxid and hydrogen sulfid. By enriching water-gas with hydrogen however, I am enabled to secure a proper and economical balance between the reducing and heating components of the mixture.

The reduced metallic powder is delivered from the furnace into air-tight chambers and allowed to cool. The ore could be reduced by means of carbon but some undecomposed carbon always remains and in the subsequent electrolysis contaminates the electrolytic copper, so that the gaseous reduction is preferable. The cold metallic powder is preferably then used as an anode in a suitable electrolyte. The cathodes can be sheets of copper or revolving tubes. Owing to the very finely divided or powdered condition of the metal, the acid liberated by electrolysis dissolves the anodes very quickly and the baths do not become acid for a long time.

I claim:

1. The method of reducing copper ores to the metallic state, which consists in passing over them at a low red heat, a mixture of hydrogen and water gas.

2. The method of reducing copper ores to the metallic state, which consists in passing over them in a suitable furnace at a low red heat, a mixture of hydrogen and water gas, and burning the residual gases under or around the furnace.

In testimony whereof, I affix my signature in presence of two witnesses.

ALEXANDER S. RAMAGE.

Witnesses:
J. H. BRICKENSTEIN,
C. W. FOWLER.